United States Patent [19]

Ohi et al.

[11] 3,982,944

[45] Sept. 28, 1976

[54] ANTIFOGGANT DISPERSION FOR COLOR PHOTOGRAPHIC MATERIALS

[75] Inventors: Reiichi Ohi; Takeo Shimada; Yasushi Oishi, all of Minami-ashigara, Japan

[73] Assignee: Fuji Photo Film Co., Ltd., Minami-ashigara, Japan

[22] Filed: Feb. 6, 1975

[21] Appl. No.: 547,681

[30] Foreign Application Priority Data

Feb. 6, 1974 Japan ................................ 49-15106

[52] U.S. Cl. ........................................ 96/56; 96/74; 260/625

[51] Int. Cl.² ........................................ G03C 7/00

[58] Field of Search .................. 96/56, 74; 260/625

[56] References Cited

UNITED STATES PATENTS

| | | | |
|---|---|---|---|
| 2,336,327 | 12/1943 | Weissberger et al. | 96/56 |
| 2,360,290 | 10/1944 | Vittum et al. | 96/56 |
| 2,728,659 | 12/1955 | Loria et al. | 96/56 |
| 3,424,821 | 1/1969 | Hunter | 260/625 |
| 3,700,453 | 10/1972 | Knechel | 96/56 |

*Primary Examiner*—J. Travis Brown

*Attorney, Agent, or Firm*—Sughrue, Rothwell, Mion, Zinn and Macpeak

[57] ABSTRACT

A stable emulsified dispersion for preventing the occurrence of color fog of silver halide color photographic materials comprising a dispersion prepared by dissolving 2,5-bis(1′,1′-dimethylbutyl)hydroquinone and another aliphatic hydrocarbon group-substituted hydroquinone in a high boiling organic solvent and dispersing the solution in a hydrophilic colloid medium.

9 Claims, No Drawings

ANTIFOGGANT DISPERSION FOR COLOR PHOTOGRAPHIC MATERIALS

BACKGROUND OF THE INVENTION

1. Field of the Invention

The present invention relates to an antifoggant dispersion for silver halide photographic materials and, more particularly, it relates to a stable emulsified dispersion containing aliphatic hydrocarbon group-substituted hydroquinones for preventing color fog in silver halide color photographic materials from occurring.

2. Description of the Prior Art

An undesirable phenomenon called color fog or color stain is well-known to occur in a color photographic material of the type which contains color forming couplers in silver halide photographic emulsion layers and which is developed using a p-phenylenediamine color developing agent and various methods have been proposed for preventing the occurrence of such a phenomenon, as described in, for instance, U.S. Pat. Nos. 2,360,290, 2,728,659 and 3,700,453. The present invention relates to an improvement in these methods.

According to the method described in the above-described U.S. patents as alkyl group-substituted hydroquinone derivative which is sparingly soluble in water is dissolved in a high boiling organic solvent which is sparingly soluble in water, such as dibutyl phthalate and tricresyl phosphate, and the solution thus prepared is finely dispersed in a hydrophilic colloid medium. This method has, however, the difficulty that the alkyl group-substituted hydroquinone derivative crystallizes due to the low solubility of the hydroquinone derivative in the high boiling organic solvent. For instance, the specifications of U.S. Pat. Nos. 2,360,290 and 2,728,659 disclose that when di-t-octylhydroquinone or di-n-dodecylhydroquinone is used, crystal deposition becomes remarkable where 0.5 part by weight of tricresyl phosphate is used per part by weight of the hydroquinone derivative, which makes the practical employment of such a method difficult. To overcome this difficulty, U.S. Pat. No. 3,700,453 discloses a method of using a mixture of two or more hydroquinone derivatives, each of which is substituted with a secondary alkyl group having at least 9 carbon atoms, and further this patent discloses that such a mixture is obtained by distilling the reaction product prepared by reacting hydroquinone and primary olefins having at least 9 carbon atoms for a long period of time at a high temperature in the presence of a Lewis acid catalyst. This method may be a manner of obtaining a stable emulsified dispersion but the method is considered to have the disadvantage that it is difficult to maintain the ratio of the components in the mixture constant for stabilizing the quality of the products. That is, the dodecyl hydroquinones prepared by the reaction of hydroquinone and 1-dodecene as described in the above-described patent is a mixture of 17 different alkyl-substituted hydroquinone derivatives, i.e., five different monoalkyl hydroquinone derivatives and 12 different dialkyl hydroquinone derivatives by gas chromatographic analysis and it will be almost impossible to maintain the ratio of such a large number of components constant. Also, another disadvantage in the above-described method is that the antifoggant effect per weight of the mixture is low, which is considered to be caused by the low proportion of the hydroquinone portion having photographic activity to the alkyl-substituted portion.

SUMMARY OF THE INVENTION

A first object of this invention is, therefore, to provide an emulsified dispersion of a mixture of aliphatic hydrocarbon group-substituted hydroquinones, which is obtained always with a constant hydroquinone component ratio in the mixture giving a stable product quality.

A second object of this invention is to provide a mixture of aliphatic hydrocarbon group-substituted hydroquinones having high solubility.

A third object of this invention is to provide a stable emulsified dispersion of a mixture of aliphatic hydrocarbon group-substituted hydroquinones.

A fourth object of this invention is to provide an emulsified dispersion of an aliphatic hydrocarbon group-substituted hydroquinone mixture from which crystal deposition of the aliphatic hydrocarbon group-substituted hydroquinones in hydrophilic colloid media for silver halide photographic materials does not occur.

A fifth object of this invention is to provide an emulsified dispersion of a mixture of aliphatic hydrocarbon group-substituted hydroquinones having excellent antifogging effects for silver halide photographic materials.

A sixth object of this invention is to provide a fine emulsified dispersion of a mixture of aliphatic hydrocarbon group-substituted hydroquinones.

A seventh object of this invention is to provide a process for preparing the above-described emulsified dispersion.

An eighth object of this invention is to provide silver halide photographic materials, in particular, silver halide color photographic materials containing the above-described emulsified dispersion.

The above and further objects of this invention will become apparent by the following descriptions.

The above-described objects of this invention are attained using the antifoggant dispersion of this invention. That is, according to the present invention, there is provided an antifoggant dispersion for silver halide photographic materials, in particular, for silver halide color photographic materials, comprising a dispersion prepared by dissolving 2,5-bis(1',1'-dimethylbutyl)hydroquinone and at least one other aliphatic hydrocarbon group-substituted hydroquinone in a high-boiling organic solvent and dispersing the solution in a hydrophilic colloid medium.

DETAILED DESCRIPTION OF THE INVENTION

From the standpoint of the uniformity in quality of photographic materials as the primary factor in the production of photographic sensitive materials, the uniformity in the qualities of the chemical additives used in the production of the photographic sensitive materials is very important. From this standpoint, other methods than the method described in the above-described U.S. patent have been investigated, that is, the increase in solubility and the reduction in the tendency of the formation of crystals when two or more compounds having specific chemical structures each prepared as pure materials are mixed at a specific mixing ratio have been investigated. Also, as a result of these various investigations based on the fact that the alkyl group introduced into the hydroquinone contributes to the improvement of solubility only and does not contribute to an improvement in the prevention of the occurrence of color stain, it has been discovered that the above-described objects of this invention can be effectively attained by utilizing hydroquinones substituted with aliphatic hydrocarbon groups having as small a number of carbon atoms as possible provided that they can be dispersed by emulsification.

As the result of various investigations it has now been discovered that a quite stable emulsified dispersion having a high antifogging effect and excellent solubility is obtained by dissolving 2,5-bis(1',1'-dimethylbutyl)-hydroquinone, an aliphatic hydrocarbon group-substituted hydroquinone, in a high-boiling organic solvent together with various other aliphatic hydrocarbon group-substituted hydroquinones at an appropriate mixing ratio and dispersing the solution in a hydrophilic colloid medium. The preparation of 2,5-bis(1',1'-dimethylbutyl)hydraquinone used in this invention is described in Example 1 shown below. When the proportion of 2,5-bis(1',1'-dimethylbutyl)hydroquinone in the hydroquinone mixture is about 25 to 75% by weight, the mixture is highly soluble, the emulsified dispersion obtained from the mixture has excellent stability, and these effects are particularly remarkable when the proportion of the 2,5-bis(1',1'-dimethylbutyl)hydroquinone is about 50% by weight.

Furthermore, examples of aliphatic hydrocarbon group-substituted hydroquinones which can be used in this invention are described in, for instance, U.S. Pat. Nos. 2,336,327, 2,360,290, 2,403,721, 2,403,721, 2,728,659, 2,732,300, 3,700,453; and British Pat. No. 752,146.

Suitable aliphatic hydrocarbon groups which can be substituents on the hydroquinone nucleus are an alkyl group having 4 to about 20 carbon atoms, an alkenyl group having 4 to about 20 carbon atoms, and the like. Preferred hydroquinones which can be used together with 2,5-bis(1',1'-dimethylbutyl)-hydroquinone include those represented by the following general formula:

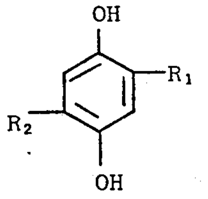

wherein $R_1$ represents an alkyl group having 4 to 20 carbon atoms or an alkenyl group having 4 to 20 carbon atoms, $R_2$ represents a hydrogen atom, an alkyl group having 4 to 20 carbon atoms or an alkenyl group having 4 to 20 carbon atoms, and wherein the total number of carbon atoms included in both $R_1$ and $R_2$ is 30 or less. Suitable examples of $R_1$ or $R_2$ include n-butyl, isobutyl, tert-butyl, n-amyl, n-hexyl, 1-methylpentyl, 1-methylhexyl, n-octyl, 1,1-dimethylhexyl, 2-ethylhexyl, tert-octyl, n-decyl, n-dodecyl, n-pentadecyl, 1-methylpentadecyl, n-octadecyl, oleyl, etc., groups.

Particularly preferred examples of aliphatic hydrocarbon group-substituted hydroquinones which can be used in this invention include 2,5-bis(1',1',3',3'-tetramethylbutyl)hydroquinone, 2,5-di-tert-butylhydroquinone, 2,5-di-tert-pentylhydroquinone, 2,5-di-n-octylhydroquinone, 2,5-di-tert-octylhydroquinone, 2-pentadecylhydroquinone, 2-dodecylhydroquinone, etc.

Appropriate high-boiling organic solvents which can be used in this invention are organic solvents which have a boiling point higher than about 160°C. and are substantially insoluble in water and are described in, for instance, U.S. Pat. Nos. 2,360,290 and 2,728,659 and U.S. patent application Ser. No. 485,655, filed July 3, 1974. For example, organic solvents for dispersing finely oleophilic materials in an aqueous medium are solvents conventionally used, e.g., for dissolving color couplers in a gelatin containing medium, as described, e.g., in U.S. Pat. Nos. 2,322,027 and 3,253,921.

More specifically, organic solvents of the above type which are substantially water-immiscible and have a boiling point of higher than about 160°C at normal pressure can be selected from carboxylic acid esters, phosphoric acid esters, carboxylic amides, ethers, carbonates, ketones, sulfonamides and substituted hydrocarbons. Specific examples of such organic solvents are di-n-butyl phthalate, di-iso-octyl phthalate, dimethoxyethyl phthalate, tricresyl phthalate, benzyl phthalate, di-n-butyl adipate, di-iso-octyl azelate, tri-n-butyl citrate, butyl laurate, di-n-butyl sebacate, tricresyl phosphate, tri-n-butyl phosphate, tri-iso-octyl phosphate, triphenyl phosphate, diphenyl mono-p-tert-butyl phenyl phosphate, mono-o-chlorophenyl phosphate, N,N-diethylcaprylic amide, N,N-dimethylpalmitic amide, n-butyl m-pentadecylphenyl ether, ethyl 2,4-di-tert-butylphenyl ether, and chlorinated paraffin.

In addition to the above-described organic solvents, a hydrophobic liquid which is mixed with an oleophilic material and is dispersed in an aqueous medium can also be used. Examples of hydrophobic liquids include castor oil, arachic oil, whale oil, turpentine oil, lard oil, dynamo oil, spindle oil, silicone oil, etc.

Of these organic solvents, di-n-butyl phthalate, tricresyl phthalate, tricresyl phosphate, dichlorodiphenyl and chlorinated paraffin are particularly preferred.

It is sometimes advantageous to use a low-boiling solvent or a water-miscible solvent with or in addition to the above-described high-boiling organic solvents. These low-boiling, water-miscible organic solvents are disclosed in U.S. Pat. Nos. 3,253,921 and 3,574,627. Examples of such solvents include:

1. Low-boiling solvents, such as propylene carbonate, methyl, ethyl, propyl, isopropyl and butyl acetates, ethyl propionate, nitromethane, nitroethane, chloroform, carbon tetrachloride, sec-butyl alcohol, etc., and 2. Water-miscible solvents, such as tetrahydrofuran, cyclohexanone, dimethylformamide, diethyl sulfoxide, methyl cellosolve, methyl isobutyl ketone, diethylene glycol monoacetate, acetonyl acetone, ethylene glycol, acetone, methanol, ethanol, and the like.

The proportion of the organic solvent used for dissolving the hydroquinone mixture ranges from about 10 to 400% by weight, preferably 25 to 200% by weight, most preferably 33 to 100% by weight, to the total weight of the aliphatic hydrocarbon group-substituted hydroquinone derivatives.

Gelatin or a gelatin derivative is suitable as the hydrophilic colloid used in this invention. Other examples of hydrophilic colloids which can be used in this invention are colloidal albumin, casein, carboxymethyl cellulose, hydroxyethyl cellulose, agar agar, sodium alginate, starch derivatives, polyvinyl alcohol, poly-N-vinyl pyrrolidone, polyacrylic acid copolymers, polyacrylamide, and the derivatives and partially hydrolyzed products of these polymers. If desired, a mixture of two or more of the above materials which are compatible with each other can be used. The gelatin generally used, can be replaced partially or completely by a gelatin derivative, that is, gelatin which has been modified by reaction with a compound having a group capable of reacting with the functional groups, such as amino groups, imino groups, hydroxyl groups, and carboxyl groups, in the gelatin molecule and replaced partially or completely with a graft gelatin formed by bonding the molecular chain of another polymer to the gelatin molecule.

Examples of the compounds suitable for forming the above-described gelatin derivative are the isocyanates, acid chlorides, and acid anhydrides as described in U.S. Pat. No. 2,614,928; the acid anhydrides as described in U.S. Pat. No. 3,118,766; the bromoacetates as described in Japanese Pat. No. 5514/1964; the phenylglycidyl ethers as described in Japanese Pat. No. 26,845/1967; the vinylsulfone compounds as described in U.S. Pat. No. 3,132,945; the N-arylvinylsulfonamides as described in British Pat. No. 861,414; the maleinimide compounds as described in U.S. Pat. No. 3,186,846; the acrylonitriles as descirbed in U.S. Patent No. 2,594,293; the polyalkylene oxides as described in U.S. Pat. No. 3,312,553; the epoxy compounds as described in Japanese Pat. No. 26,845/1967; the esters of the acids as described in U.S. Pat. No. 2,763,639; and the alkane sultones as described in British Pat. No. 1,033,189.

Also, suitable polymer chains to be grafted to gelatin are described in U.S. Pat. Nos. 2,763,625, 2,831,767, and 2,956,884 as well as in *Polymer Letters*, 5, 595 (1967), *Phot. Sci. Eng.*, 9, 148 (1965), and *J. Polymer Sci*,. A-1, 9, 3199 (1971) but the polymers or copolymers of vinyl monomers such as acrylic acid, methacrylic acid, the esters, amide derivatives, and nitrile derivatives of these acids, and styrene are preferably used. However, hydrophilic vinyl polymers which are compatible with gelatin to some extent, such as, for instance, the polymers or copolymers of acrylic acid, acrylamide, methacrylamide, hydroxyalkyl acrylates, hydroxyalkyl methacrylates, etc., are particularly preferable.

In preparing the dispersion of this invention, a surface active agent can be used as the dispersing aid and any surface active agents which are ordinarily used for producing dispersions for photographic sensitive materials can be used as a dispersing aid. Anionic surface active agents and nonionic surface active agents are preferably used, either individually or in combination. Specific examples of surface active agents which can be used are described in U.S. Pat. Nos. 2,332,027, 2,801,170, 3,525,620, 3,676,141, and 3,666,478; U.S. patent application Ser. No. 283,026, filed Aug. 23,1972. Specific examples of suitable dispersing aids are sodium alkylnaphthalene sulfonates, sodium alkylbenzene sulfonates, etc.

The aliphatic hydrocarbon group-substituted hydroquinones used in this invention can be dispersed using the method as described in, for instance, U.S. Pat. Nos. 2,360,290, 2,304,939, 2,322,027, 2,801,170 2,801,171, 2,949,360, 3,253,921, and 3,619,195, and 2,728,695, i.e., the aliphatic hydrocarbon group-substituted hydroquinones are first dissolved, in a high-boiling point solvent by, e.g., heating, and the solution is then dispersed in a hydrophilic colloid. An average particle size which can be used generally ranges from about 0.05 to about 0.8 $\mu$, preferably 0.1 ~ 0.5 $\mu$. As the dispersing means used for practicing the present invention, any means which is capable of producing a large shearing force in the liquid to be treated or giving rise to high ultrasonic energy can be used suitably. Of these various means, a colloid mill, a homogenizer, a capillary-type emulsifying means, a liquid means, an electromagnetic striction type sonic wave generator, an emulsifying means equipped with a Pohleman whistle, etc., produce better results.

The dispersion of the alkyl-substituted hydroquinones in the hydrophilic colloid dispersion provided by the present invention can be incorporated in the coating compositions for layers of multilayer color photographic materials, such as silver halide emulsion layers, intermediate layers, protective layers, etc., as described in U.S. Pat. No. 3,700,453.

A feature of this invention is that a stable quite fine emulsified dispersion which has a constant composition, which has a high proportion of hydroquinone active groups per total weight of the dispersion, and in which a breaking of the emulsion due to the precipitation of crystals does not occur can be obtained by dissolving a mixture of 2,5-bis (1',1'-dimethylbutyl)hydroquinone which is a novel compound and another aliphatic hydrocarbon group-substituted hydroquinone or hydroquinones in a smaller amount than usually employed of a high-boiling organic solvent and dispersing the solution in a hydrophilic colloid medium. The high proportion of the hydroquinone active group per total weight of the emulsified dispersion of the present invention can reduce the total amount of the dispersion in producing photographic materials, whereby the physical strength of the gelatin coated layers of color photographic materials is increased and also an increase in the sharpness of photographic images is obtained due to the ability to reduce the thickness of the coatings of color photographic materials. Furthermore, as will be clear from the examples shown hereinafter, the antifoggant dispersion of this invention has finer dispersoid than that of conventional dispersions prepared using any of the known techniques and further the antifogging effect due to the antifoggant dispersion of this invention is higher.

The silver halide photographic material to which the dispersion of this invention can be suitably applied is a conventional multilayer color photographic material of the type that is prepared using coating compositions prepared by dissolving oil-soluble couplers in high-boiling organic solvents and dispersing by emulsification of the solutions into hydrophilic colloids. Furthermore, the emulsified dispersion of this invention does not give rise to adverse influences due to the interaction with conventional stabilizers, optical sensitizers, hardening agents, etc., and no inferior properties have been found for the dispersion of this invention in comparison with conventional dispersions.

The halogen composition, grain size and crystal form of the silver halide crystals used in this invention are not limited or restricted in any way but these aspects will be explained below in detail.

A silver halide emulsion is usually prepared by mixing a water-soluble salt such as silver nitrate and a water-soluble halide such as potassium bromide in the presence of a aqueous solution of a water-soluble polymer such as gelatin. Suitable silver halides are silver chloride, silver bromide, silver chlorobromide, silver iodobromide, silver chloroiodobromide, etc. The form of the silver halide grains can be a cubic system, an octahedral system, or a mixed crystal system. These silver halide grains can be, of course, prepared by any known and conventional techniques and a single jet method, a double jet method, or a control double jet method can be advantageously used. Moreover, two or more silver halide photographic emulsions, which have been prepared separately, can be mixed together. Furthermore, the silver halide grains can comprise crystals having uniform characteristics throughout the entire crystal or a layer structure in which the outer layer has different characteristics from the inner portion, or further can be a converted type crystal structure as described in the specification of British Pat. No. 635,841 and U.S. Pat. No 3,622,318. Also, the silver halide crystals can be a type which mainly forms a latent image in the surface portion of the crystal or a type where a latent image is formed in the inside of the grain. These photographic emulsions are described in C. E. K. Mees & T. H. James, *The Theory of the Photographic Process*, 3rd Ed., Macmillan Co., New York (1966); P. Grafikides, *Chimie Photographique*, Paul Montel Co., Paris (1957), etc., and can be prepared by a conventional method such as an ammonia method, a neutralization method, an acid method, etc. After the formation of the silver halide grains, the silver halide grains are washed with water to remove from the system water-soluble salts (for instance, potassium nitrate when silver bromide is formed using silver nitrate and potassium bromide) and then the silver halide grains are heat-treated in the presence of a chemical sensitizer such as sodium thiosulfate, N, N, N'-trimethyl thiourea, a thiocyanate complex salt of monovalent gold, a thiosulfate complex salt of monovalent gold, stannous chloride, hexamethylene tetramine, etc., to increase the sensitivity of the silver halide grains without coarsening the silver halide grains. These methods are also described in Mees and James, supra and Grafikides, supra.

Gelatin is preferably used as the hydrophilic colloid employed for the silver halide emulsions, but the above-described hydrophilic colloids explained as the dispersion media for the aliphatic hydrocarbon group-substituted hydroquinone derivatives can be also used.

The silver halide emulsion described above can be chemically sensitized using conventional techniques. Examples of suitable chemical sensitizers which can be used for sensitization are the chloroaurates and gold trichloride as described in U.S. Pat. Nos. 2,399,083, 2,540,085, 2,597,856, and 2,597,915; the salts of noble metals such as platinum, palladium, iridium, rhodium, and ruthenium as described in U.S. Pat. Nos. 2,448,060, 2,540,086, 2,566,245, 2,566,263, and 2,598,245; sulfur compounds capable of forming silver sulfide by the reaction with silver salts as described in U.S. Pat. Nos. 1,574,944, 2,410,689, 3,189,458, and 3,501,313; and the stannous salts, amines, and other reductive materials as described in the specifications of U.S. Pat. Nos. 2,487,850, 2,518,698, 2,521,925, 2,521,926, 2,694,637, 2,983,610, and 3,201,254.

Moreover, the silver halide photographic emulsions as described above can be, if desired, spectrally sensitized or supersensitized using cyanine dyes such as the cyanines, merocyanines, carbocyanines, etc., individually or as a combination thereof, or using a combination of a cyanine dye and a styryl dye. These dye sensitization techniques are well known and are described in U.S. Pat. Nos. 2,493,748, 2,519,001, 2,977,229, 3,480,434, 3,672,897, 3,703,377, 2,688,545, 2,912,329, 3,397,060, 3,615,635, and 3,628,964; British Pat. Nos. 1,195,302, 1,242,588, and 1,293,862; West German OLS Nos. 2,030,326 and 2,121,780; Japanese Pat. Nos. 4936/1968, 14,030/1969, and 10,773/1968; U.S. Pat. Nos. 3,511,664, 3,522,052, 3,527,641, 3,615,613, 3,615,632, 3,617,295, 3,635,721, and 3,694,217; and British Pat. Nos. 1,137,580 and 1,216,203. These spectral sensitizers can be appropriately selected depending on the wavelength regions to be sensitized, the sensitivity to be achieved and the end-use purposes of the photosensitive materials.

Various couplers can be used for the color photographic materials in this invention. For instance, diffusion resistant couplers, a diffusion resisting oil-solubilizing group and diffusion resistant couplers having both a diffusion resisting oil-solubilizing group and a water-solubilizing group, but, in particular, the couplers having various diffusion resistant oil-solubilizing groups as described in U.S. Pat. Nos. 2,920,961, 2,600,788, 3,418,129, 3,681,076, 3,062,653, and 2,474,243; West German OLS No. 2,216,578; and Japanese patent application Ser. Nos. 35,379/1973 and 69,383/1973 are preferably used.

The kinds of couplers which can be used in this invention include yellow color forming couplers, magenta color forming couplers, cyan color forming couplers, development inhibitor releasing couplers, colorless couplers, and competing couplers. Examples of yellow color forming couplers which can be used in this invention are described in, e.g., U.S. Pat. Nos. 3,265,506, 2,728,658, 3,369,895, 3,582,322, 3,408,184, 3,415,652, 3,253,924, 2,434,272, 3,703,375, and 3,516,831; British Pat. Nos. 1,286,411, 1,040,710, and 1,302,398; West German OLS Nos. 1,956,281, 2,162,899, and 2,213,461; and Japanese patent application Ser. No. 3039/1972. Examples of magenta color forming couplers and the colored couplers thereof are described in, e.g., U.S. Pat. Nos. 2,600,788, 3,558,319, 2,439,098, 3,468,666, 3,419,391, 3,311,476, 3,061,432, 3,476,560, 3,253,924, 2,434,272, and 3,516,831; and British Pat. No. 1,293,640; and Japanese patent application Ser. Nos. 21,454/1973 and 45,971/1973. Furthermore, cyan couplers and the colored couplers thereof which can be used in this invention are described in U.S. Pat. Nos. 2,369,929, 2,474,293, 3,591,383, 3,458,315, 3,311,476, 3,419,390, 3,476,563, 3,253,924, 2,434,272, 3,703,375, 3,516,831, and 3,311,476; British Pat. No. 1,201,110; Japanese Pat. No. 5547/1964; and U.S. Pat. Nos. 3,034,892 and 3,386,301.

Also, the colorless couplers and competing couplers which can be used in this invention are described in U.S. Pat. Nos. 3,174,862, 3,520,690, 2,742,832, 3,560,212, 3,580,722, and 3,227,554; British Pat. Nos. 861,138, 904,365, and 1,204,964; and Japanese Pat. No. 14,033/1970.

Still further, development inhibitor releasing couplers which can be used in this invention are described in U.S. Pat. Nos. 3,148,062, 3,227,554, 3,701,783, 3,617,291, and 3,622,328; West German OLS No. 2,163,811; Japanese Pat. No. 28,836/1970; and Japanese patent application Ser. No. 33,238/1973.

On the other hand, other compounds which release development inhibitors which can be used in this invention are described in U.S. Pat. Nos. 3,379,529, 3,639,417, 3,297,445, and 3,632,345.

Preferably these couplers are dissolved in the high-boiling organic solvent and then dispersed by emulsification in a hydrophilic colloid medium as the solution thereof and to prepare the dispersion the method as described in U.S. Pat. Nos. 3,551,157, 2,304,939, and 2,322,027 is preferred.

Each of the layers of the color photographic materials of this invention can be coated by means of a dip coating method, an air knife coating method, a curtain coating method, or an extrusion coating method using the hopper as described in U.S. Pat. No. 2,681,294. Moreover, if desired, two or more photographic layers can be coated simultaneously using the method described in U.S. Pat. Nos. 2,761,791, 3,508,947, 2,941,898, and 3,526,528.

The photographic emulsions are coated on a substantially planar support which does not undergo severe dimensional change during processing, such as a glass sheet, a metallic sheet, a ceramic plate, and flexible supports. Typical examples of suitable flexible supports are cellulose nitrate films, cellulose acetate films, cellulose acetate butyrate films, cellulose acetate propionate films, polystyrene films, polyethylene terephthalate films, polycarbonate films, laminate films, thin glass films, and papers. Also, papers coated or laminated with baryta or a polymer of an alpha-olefin having 2 and 10 carbon atoms, such as polyethylene, polypropylene, an ethylene-butene copolymer and further a synthetic resin film, the surface of which has been matted to improve the adhesion with other polymers and improve the printability as described in Japanese Pat. No. 19,068/1972, can be used as the support.

A transparent support or an opaque support can be selected as the support depending on the kind of the photographic material. The transparent support can be colorless or can be colored by adding a dye or pigment as frequently employed in X-ray films and as known in *J.S.M.P.T.E.*, 67, 296 (1958).

Opaque supports include paper which are originally opaque and also an opaque film which has been opacified by incorporating a dye or a pigment such as titanium dioxide in a transparent film as well as a synthetic resin film, the surface of which has been treated by the method as described in Japanese Pat. No. 19,068/1972 and further a paper and a plastic film in which carbon black, etc., has been added to complete the opacity. If the support has an insufficient adhesion to the photographic layer to be coated thereon, a layer having a high adhesion to both the support and a photographic layer can be coated on the support as a subbing layer. Furthermore, for further improving the adhesion of the support, the surface of the support can be pre-treated by corona discharge, ultraviolet radiation, flame treatment, etc.

The silver halide photographic material of this invention after exposure is color-developed using a primary aromatic amino compound such as a p-phenylenediamine derivative. Typical examples of color developing agents are the inorganic acid salts of N,N-amino-diethyl-p-phenylenediamine, 2-amino-5-diethylamino-toluene, 2-amino-5-(N-ethyl-N-laurylamino)toluene, 4-[N-ethyl-N-(β-hydroxyethyl)amino]aniline, and 3-methyl-4-amino-N-ethyl-N-(β-hydroxyethyl)aniline. Other typical examples of color developers are 4-amino-3-methyl-N-ethyl-N-(β-methanesulfoamidoethyl)aniline sesquisulfate monohydrate as described in U.S. Pat. No. 2,193,015; N-(2-amino-5-diethylaminophenylethyl)-methanesulfoamide sulfate and N,N-dimethyl-p-phenylenediamine hydrochloride as described in U.S. Pat. No. 2,592,364; and 3-methyl-4-amino-N-ethyl-N-methoxyethylaniline as described in Japanese patent application Ser. No. 64,933/1973. These color developing agents are described in detail in L. F. A. Mason, *Photographic Processing Chemistry*, pages 226 – 229, Focal Press, London (1966). Also, the color developing agent can be used together with a 3-pyrazolidone. Also, if desired, various additives can be added to a color developer containing the above-described color developing agent. Specific examples of suitable additives are an alkali (e.g., an alkali metal or ammonium hydroxide, carbonate, and phosphate), a pH-adjusting agent or a buffer (e.g., a weak acid such as acetic acid and boric acid, and a weak base, and the salts of these acids and bases), a development accelerator (e.g., the various pyridinium compounds and cationic compounds as described in U.S. Pat. Nos. 2,648,604 and 3,671,247; potassium nitrate and sodium nitrate; the polyethylene glycols and the derivatives thereof as described in U.S. Pat. Nos. 2,533,990, 2,577,127, and 2,950,970; nonionic compounds such as the polythioethers as described in British Pat. Nos. 1,020,033 and 1,020,032; polymers having sulfite esters as described in U.S. Pat. No. 3,068,097; organic amines such as pyridine and ethanolamine; benzyl alcohol; and hydrazines), an antifoggant (e.g., an alkali metal bromide; an alkali metal iodide; the nitrobenzimidazoles as described in U.S. Pat. Nos. 2,496,940 and 2,656,271; mercaptobenzimidazole; 5-methylbenztriazole; 1-phenyl-5-mercaptotetrazole; the compounds for rapid processing as described in U.S. Pat. Nos. 3,113,864, 3,342,596, 3,295,976, 3,615,522, 3,295,976, and 3,597,199; the thiosulfonyl compounds as described in British Pat. No. 972,211; the phenazine-N-oxides as described in Japanese Pat. No. 41,675/1971; and other antifoggants as described in *Kagaku Shashin Binran* (*Handbook of Scientific Photography*), Vol. 2, pages 29 ~ 47), the stain or sludge-preventing agents as described in U.S. Pat. Nos. 3,161,513 and 3,161,514 and British Pat. Nos. 1,030,442, 1,144,481, and 1,251,558; and an interlayer effect promotor and preservatives (e.g., sulfites, acid sulfites, hydroxylamine hydrochloride, formsulfite, and alkanol aminesulfite addition products) as described in U.S. Pat. No. 3,536,487.

The photographic material of this invention is also bleached in a conventional manner after the color development. This bleaching can be, if desired, carried out using a blix bath containing further a fixing agent together with a bleaching agent. Various compounds can be used as a bleaching agent and of these compounds, multivalent metal compounds such as ferricyanates, bichromates, water-soluble cobalt(II) salts, water-soluble copper(II) salts, water-soluble quinones, nitrosophenols, iron(III) compounds, cobalt(III) compounds, and copper(III) compounds, in particular, the complex salts of these multivalent metal cations and organic acids such as ethylenediamine tetraacetic acid, nitrilotriacetic acid, iminodiacetic acid, N-hydroxyethylenediaminetriacetic acid, an aminopolycarboxylic acid, malonic acid, tartaric acid, malic acid, diglycolic acid, and dithioglycolic acid; 2-6-dipicolinic acid copper complex salt; peracids such as alkyl peracids, persulfates, permanganates, and hydrogen peroxide; hypochlorites; chloride; bromide; etc., can be used individually or as a combination thereof.

The method of using 2,5-bis(1′,1′-dimethylbutyl)-hydroquinone in this invention and the color photographic materials of this invention are illustrated in greater detail by the following examples. Unless otherwise indicated, all parts, percents, ratios and the like are by weight.

EXAMPLE 1

Preparation of 2,5-bis(1′,1′-Dimethylbutyl)hydroquinone

To 400 ml of methanol was added dropwise 30 ml of concentrated sulfuric acid with stirring under ice cooling and after adding further 220 g of hydroquinone followed by stirring, 370 g of 2-methyl-1-pentene was added dropwise to the mixture at 30° – 35°C. Then, the resultant mixture was stirred for 4 hours at 30° – 35°C and 1 l of water was added to the reaction mixture to form crystals, which were recovered by filtration. By recrystallizing the crystals from a mixed solvent of benzene and n-hexane in a 1:3 by volume ratio, 410 g of white rhombic crystals of the desired compound having a melting point of 122°C was obtained.

EXAMPLE 2

The following procedure was carried out to demonstrate that the antifoggant dispersion of this invention is obtained as a fine dispersion and the dispersion obtained is stable. The size of the particles in the dispersion was measured by measuring the optical density ratio $D_{400}/D_{500}$ at 400 mμ and 500 mμ according to the method disclosed in R. J. Gledhill, *Journal of Physical Chemistry*, Vol. 66, 458 – 463 (1962). As the particle size decreases, the value of $D_{400}/D_{500}$ increases and hence by comparing the value of the optical densities, the relative values of the particle sizes can be determined.

In 20 g of the alkyl hydroquinones as shown in Table 1 was dissolved 20 g of tricresyl phosphate and the solution was dispersed by emulsification in 1 l of a 7% gelatin aqueous solution. A part of the solution was diluted with water to 1,500 times the original volume and then the optical densities at 400 mμ and 500 mμ were measured, while another part of the solution was allowed to stand for 3 weeks at 5°C, diluted with water to 1,500 times the original volume, and then the optical densities at 400 mμ and 500 mμ were measured.

The same test as described above was repeated using a known compound, 2,4-bis(1′,1′,3′,3′-tetramethyl)-hydroquinone as the alkyl hydroquinone. The results of both cases are shown in the following table.

TABLE 1

| Run No. | Alkyl Hydroquinone No. | Alkyl Hydroquinone Amount | $D_{400}/D_{500}$ Directly after Preparation | $D_{400}/D_{500}$ after 3 Weeks Storage |
|---|---|---|---|---|
| | | (g) | | |
| A | II* | 20 | 1.75 | 1.42 |
| B | I* | 5 | 2.03 | 1.98 |
| | II | 15 | | |
| C | I | 10 | | |
| | II | 10 | 2.22 | 2.20 |
| D | I | 15 | 2.18 | 2.13 |
| | II | 5 | | |

*The alkyl hydroquinones used in the above procedures were as follows:

I. The compound of this invention:

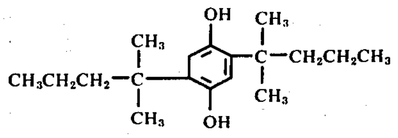

2,5-bis(1′,1′-Dimethylbutyl)hydroquinone

II. Known compound:

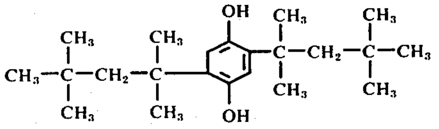

2,4-bis(1′,1′,3′,3′-Tetramethylbutyl)hydroquinone

The difference between the values 2.03 and 1.75 of Alkyl Hydroquinone B and Alkyl Hydroquinone A measured directly after the preparation of the dispersions shown in Table 1 might superficially be considered a slight difference but as is clear from Gledhill, supra, this difference corresponds to a particle size difference of about 2.5 times. Also, the value 1.42 of Alkyl Hydroquinone A after storage for 3 weeks shows a quite large particle size and this value also shows that the dispersion was substantially opacified and could not be used as an antifoggant dispersion for photographic purposes.

EXAMPLE 3

A procedure was carried out to demonstrate the anti-fogging power of the antifoggant emulsion of this invention. That is, a multilayer color photographic material was prepared by coating on a cellulose triacetate support a gelatin layer containing a cyan color forming coupler, N-dodecyl-1-hydroxy-2-naphthamide as a first layer at a coverage of 50 mg/ft² of the cyan color forming coupler, 50 mg/ft² of dibutyl phthalate, and 100 mg/ft² of gelatin; a gelatin layer as a second layer at a coverage of 100 mg/ft² of gelatin; and a gelatino silver halide emulsion layer containing a yellow color forming coupler, 2-(p-anisoyl)-2′-chloro-5′-(2,4-di-t-amylphenoxyacetamido)acetoanilide as a third layer at a coverage of 200 mg/ft² of silver halide, 100 mg/ft² of the yellow color forming coupler, and 200 mg/ft² of gelatin. The sample was exposed through a continuous optical wedge and then processed according to the following processings, whereby the silver halide in the third layer was reduced in proportion to the exposure amount to form a yellow dye at the same time and in this case the oxidized color developing agent partially diffused through the second layer to the first layer to form there a cyan dye by the coupling with the cyan color forming coupler. This phenomenon is a problem occurring also in commercial multilayer color photographic materials and is quite harmful to color reproduction.

When, in the preparation of the test samples in the above-described manner, an emulsified dispersion of an alkyl hydroquinone was incorporated in the second layer, the oxidized color developing agent which was diffusable was caught by the alkyl hydroquinone to inhibit the formation of the cyan dye in the first layer. Therefore, by checking the capability on inhibiting the formation of a cyan dye, the antifogging capability of the antifoggant emulsified dispersion of this invention can be determined. The results obtained are shown in Table 2. Samples No. 2 to No. 5 shown in the table each contained 20 mg/ft$^2$ of the Alkyl Hydroquinones A to D in Table 1 of Example 2, respectively.

TABLE 2

| Sample No. | Alkyl Hydroquinone in Second Layer | Optical Density of Cyan Dye at the Maximum Color Density Portion of the Yellow Dye |
|---|---|---|
| 1 | None | 0.74 |
| 2 | A | 0.45 |
| 3 | B | 0.38 |
| 4 | C | 0.31 |
| 5 | D | 0.34 |

From the results shown in the above table, it can be clearly seen that when an alkyl hydroquinone was added to the second layer, diffusion of the oxidized color developing agent at processing was inhibited and the use of the emulsified dispersions of Alkyl Hydroquinones B, C, and D respectively showed a higher effect than the use of the known emulsified dispersion of Alkyl Hydroquinone A.

The color developing procedures and the formulations of the processing compositions used in the above are shown below.

| Process | Temperature (°C) | Time (min) |
|---|---|---|
| Color Development | 24 | 12 |
| Wash | " | 4 |
| Blix | " | 4 |
| Wash | " | 8 |
| Stabilization | " | 1 |

| | |
|---|---|
| Color Developer | |
| Benzyl Alcohol | 12.6 ml |
| Sodium Hexametaphosphate | 2.0 g |
| Sodium Sulfite (anhydrous) | 2.1 g |
| Sodium Hydrogencarbonate | 2.9 g |
| Sodium Carbonate (monohydrate) | 26.8 g |
| Potassium Bromide | 0.48 g |
| Sodium Chloride | 0.7 g |
| Hydroxylamine Sulfate | 2.1 g |
| 4-(N-Ethyl-N-$\beta$-methanesulfonamidoethylamino)-2-methylaniline . sesquisulfate | 6 g |
| Water to make | 1000 ml (pH: 9.95) |
| Blix Solution | |
| Ferric Salt of Ethylenediamine Tetraacetic Acid | 45 g |
| Ammonium Thiocyanate | 10 g |
| Sodium Sulfite | 10 g |
| Sodium Thiosulfate (60% aqueous solution) | 100 ml |
| Tetrasodium Ethylenediamine Tetraacetate | 5 g |
| Water to make | 1000 ml |
| Stabilization Bath | |
| Tartaric Acid | 10 g |
| Zinc Sulfate | 10 g |
| Sodium Metaborate | 20 g |
| Water to make | 1000 ml |

While the invention has been described in detail and with reference to specific embodiments thereof, it will be apparent to one skilled in the art that various changes and modifications can be made therein without departing from the spirit and scope thereof.

What is claimed is:

1. An antifoggant dispersion for silver halide photographic materials comprising a hydrophilic colloid medium dispersion of a solution of a mixture of 2,5-bis(-1',1'-dimethylbutyl)hydroquinone and at least one other aliphatic hydrocarbon group-substituted hydroquinone in a high-boiling organic solvent.

2. The antifoggant dispersion as set forth in claim 1, in which the proportion of the 2,5-bis(1',1'-dimethylbutyl)-hydroquinone is about 25 to 75% by weight based on the total weight of the hydroquinone mixture.

3. The antifoggant dispersion as set forth in claim 1, wherein said aliphatic hydrocarbon-group-substituted hydroquinone is represented by the general formula:

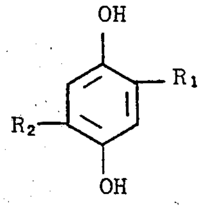

wherein $R_1$ represents an alkyl group having 4 to 20 carbon atoms or an alkenyl group having 4 to 20 carbon atoms, $R_2$ represents a hydrogen atom, an alkyl group having 4 to 20 carbon atoms or an alkenyl group having 4 to 20 carbon atoms, and wherein the total number of carbon atoms included in both $R_1$ and $R_2$ is 30 or less.

4. The antifoggant dispersion as set forth in claim 3, in which said aliphatic hydrocarbon group-substituted hydroquinone is 2,5-bis(1',1',3',3'-tetramethylbutyl)-hydroquinone, 2,5-di-tert-butylhydroquinone, 2,5-di-n-octylhydroquinone, 2,5-di-tert-octylhydroquinone, 2-pentadecylhydroquinone, or 2-dodecylhydroquinone.

5. The antifoggant dispersion as set forth in claim 1, in which said high-boiling organic solvent is dibutyl phthalate or tricresyl phosphate.

6. The antifoggant dispersion as set forth in claim 1, in which the amount of the high-boiling organic solvent is about 10 to 400% by weight based on the total weight of the aliphatic hydrocarbon group-substituted hydroquinone derivative.

7. A multilayer color photographic material comprising a support having photographic layers thereon, at least one of said photographic layers containing the antifoggant dispersion as set forth in claim 1, comprising a hydrophilic colloid medium dispersion of a solution of a mixture of 2,5-bis(1',1'-dimethylbutyl)hydroquinone and at least one other aliphatic hydrocarbon group-substituted hydroquinone in a high-boiling organic solvent.

8. The antifoggant dispersion as set forth in claim 1, wherein the aliphatic hydrocarbon-substituent is selected from the group consisting of an alkyl group containing 4 to 20 carbon atoms and an alkenyl group containing 4 to 20 carbon atoms.

9. The antifoggant dispersion set forth in claim 1, wherein the aliphatic hydrocarbon is selected from the group consisting of n-butyl, isobutyl, tert-butyl, n-amyl, n-hexyl, 1-methylpentyl, 1-methylhexyl, n-octyl, 1,1-dimethylhexyl, 2-ethylhexyl, tert-octyl, n-decyl, n-dodecyl, n-pentadecyl, 1-methylpentadecyl, n-octadecyl, and oleyl groups.

* * * * *